(Model.)
4 Sheets—Sheet 1.
H. F. ZEHNDER.
MACHINE FOR CUTTING GREEN CORN OFF THE COB.
No. 278,210.   Patented May 22, 1883.
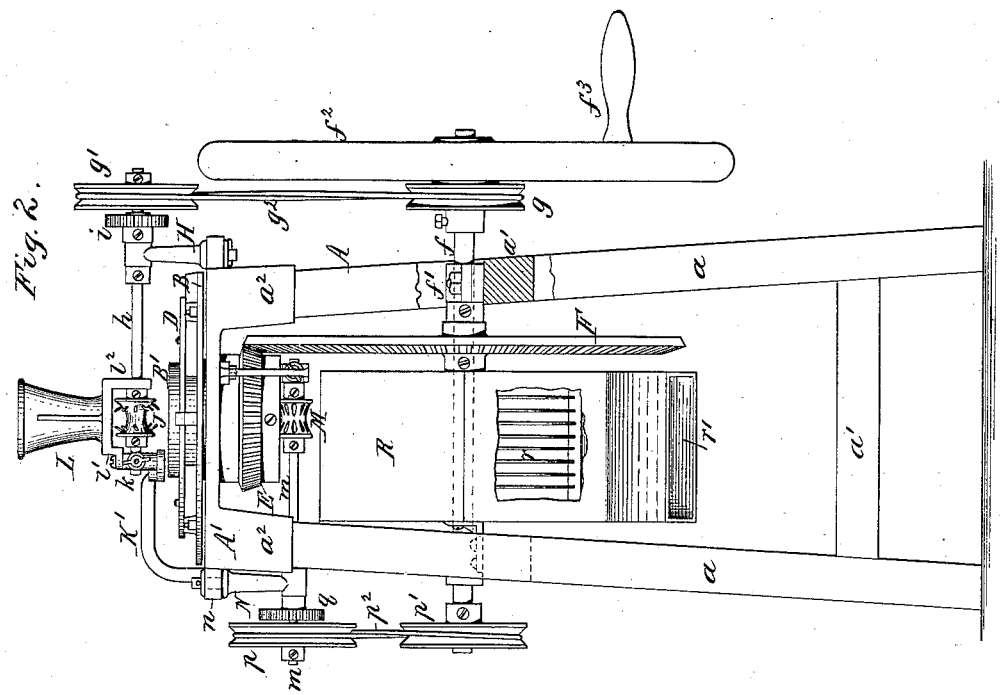
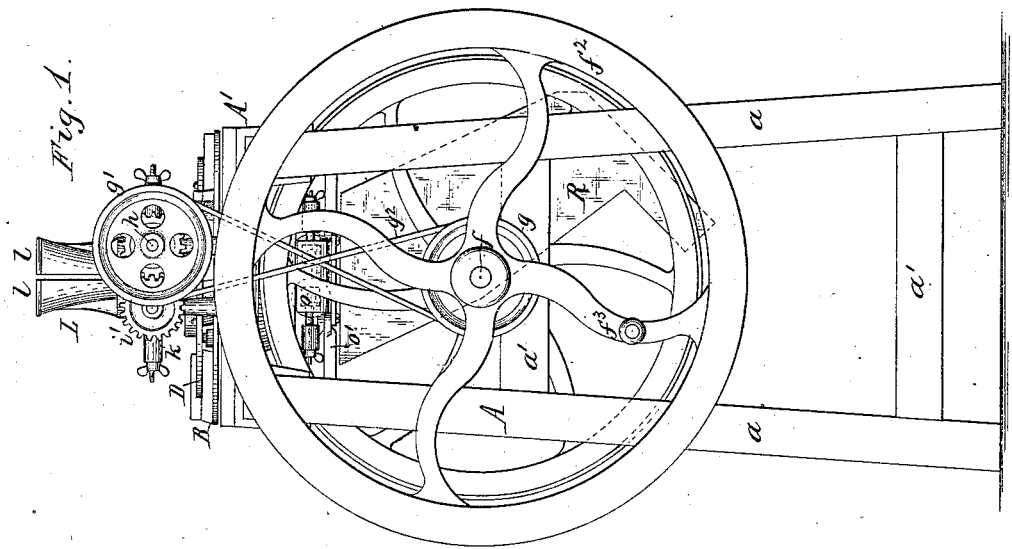
Witnesses:
Edw. J. Brady.
Theo. L. Popp.
H. F. Zehnder, Inventor.
By Wilhelm Bonner,
Attorneys.

(Model.)
H. F. ZEHNDER.
MACHINE FOR CUTTING GREEN CORN OFF THE COB.
No. 278,210. Patented May 22, 1883.
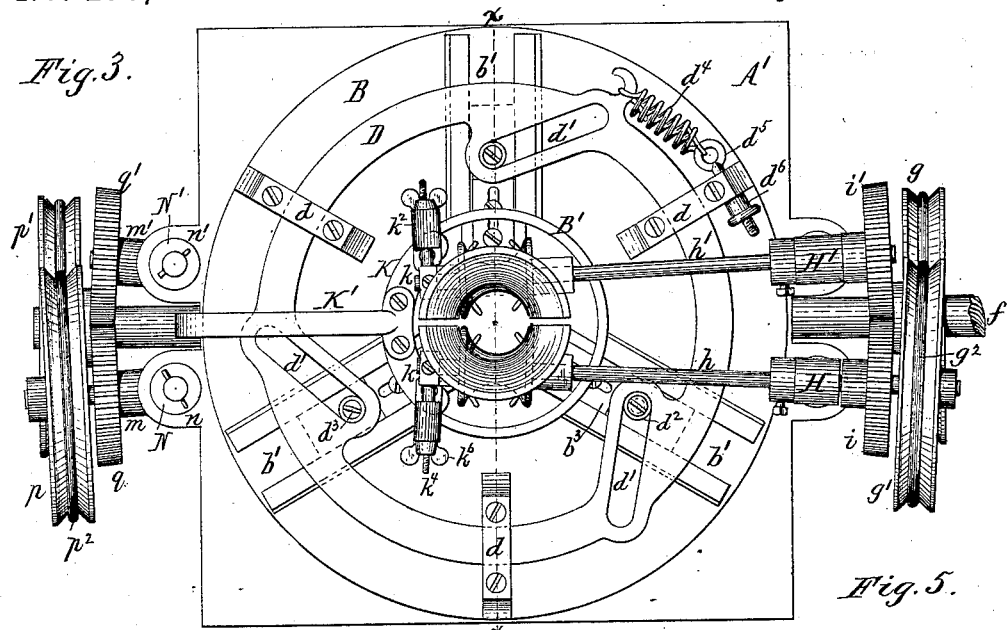
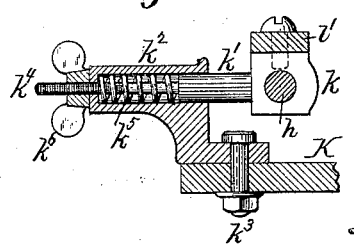
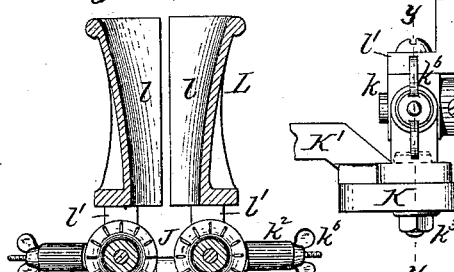
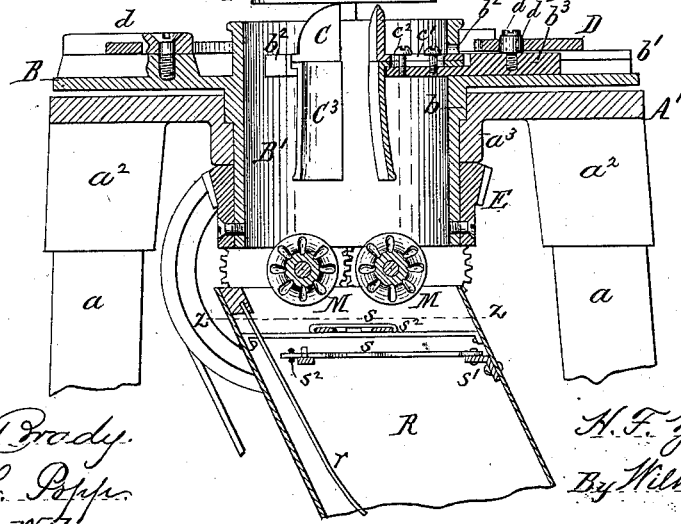
Witnesses: Edw. J. Brady. Theo. L. Popp.
Inventor: H. F. Zehnder By Wilhelm Bonner Attorneys.

(Model.) 4 Sheets—Sheet 3.
H. F. ZEHNDER.
MACHINE FOR CUTTING GREEN CORN OFF THE COB.
No. 278,210. Patented May 22, 1883.
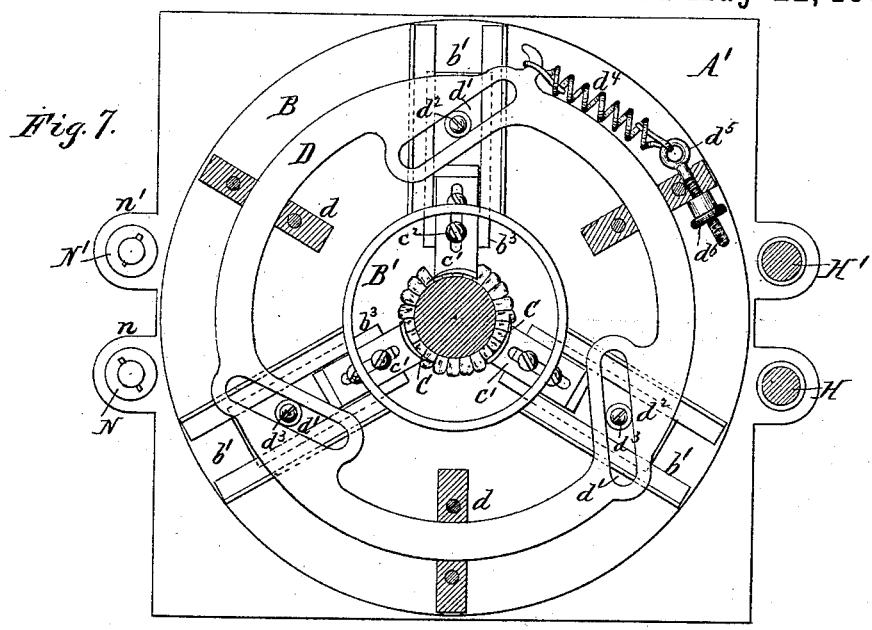
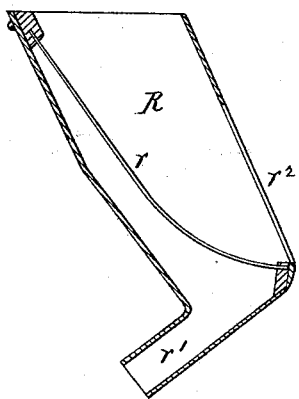
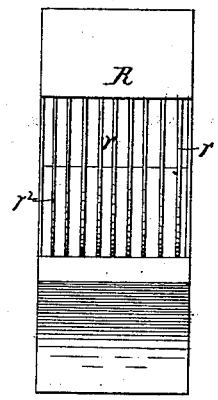
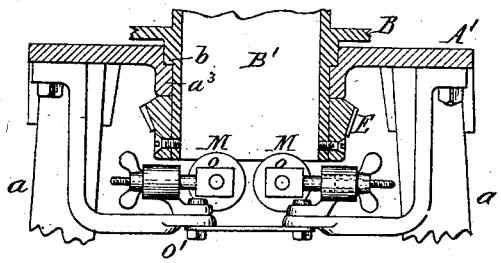
Witnesses. H. F. Zehnder Inventor.
By Wilhelm & Bonner
Attorneys.

(Model.)

H. F. ZEHNDER.
MACHINE FOR CUTTING GREEN CORN OFF THE COB.

No. 278,210. Patented May 22, 1883.

4 Sheets—Sheet 4.

Witnesses
Edw. J. Brady
Theo. L. Popp

H. F. Zehnder Inventor.
By Wilhelm Bonner
Attorneys.

UNITED STATES PATENT OFFICE.

HENRY F. ZEHNDER, OF BUFFALO, NEW YORK, ASSIGNOR OF ONE-FOURTH TO MATHEW DEUTSCHER, OF SAME PLACE.

MACHINE FOR CUTTING GREEN CORN OFF THE COB.

SPECIFICATION forming part of Letters Patent No. 278,210, dated May 22, 1883.

Application filed October 9, 1882. (Model.)

*To all whom it may concern:*

Be it known that I, HENRY F. ZEHNDER, of the city of Buffalo, in the county of Erie and State of New York, have invented new and useful Improvements in Machines for Cutting Green Corn, of which the following is a specification.

This invention relates to that class of machines which are employed for cutting the kernels of green corn from the cob preparatory to canning the same, and in which the knives are mounted in a revolving sleeve, through which the ears of corn are fed by feed-wheels arranged above and below said sleeve.

The object of my invention is to simplify the construction of this class of machines; and it consists in the improvements hereinafter described, and pointed out in the claims.

Figure 10:
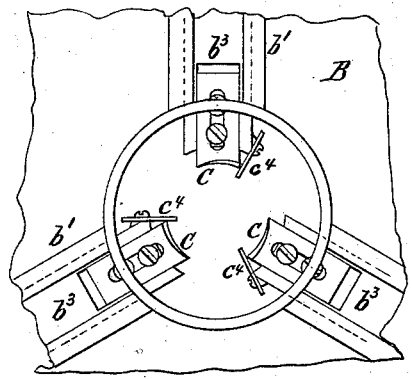
Figure 11:
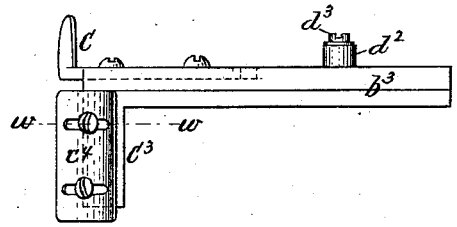
Figure 12:
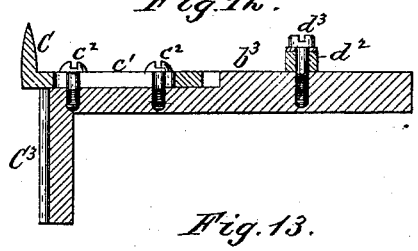
Figure 14:
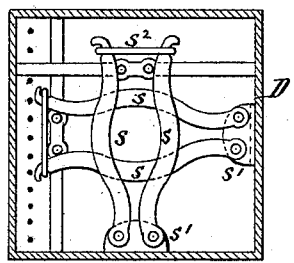
Figure 13:
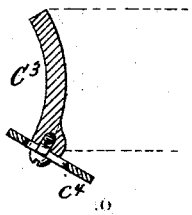
Figure 15:
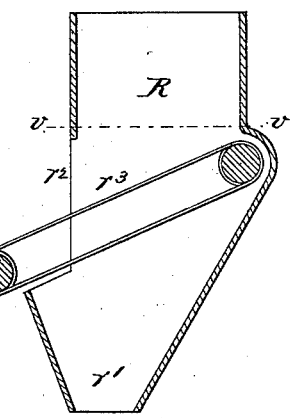
Figure 16:
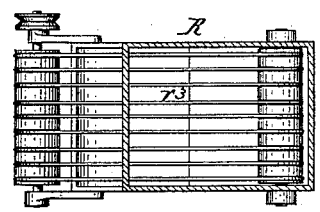

In the accompanying drawings, consisting of four sheets, Figures 1 and 2 are elevations of my improved machine at right angles to each other. Fig. 3 is a top plan view of the machine on an enlarged scale. Fig. 4 is a vertical cross-section in line $xx$, Fig. 3. Fig. 5 is an elevation of one of the feed-wheels and connecting parts on an enlarged scale. Fig. 6 is a section in line $yy$, Fig. 5. Fig. 7 is a sectional top plan view with the feed-hoppers and feed-wheels removed. Fig. 8 is a vertical section of the discharge-spout, and Fig. 9 an end elevation thereof. Fig. 10 is a fragmentary top plan view of the revolving knives and scrapers and their connecting parts. Fig. 11 is an elevation of one of the arms, with the knife and scraper attached thereto, on an enlarged scale, and Fig. 12 is a longitudinal section thereof. Fig. 13 is a horizontal section in line $ww$, Fig. 11. Fig. 14 is a horizontal cross-section of the upper portion of the discharge-spout in line $zz$, Fig. 4. Fig. 15 is a sectional elevation, showing a modified construction of the discharge mechanism. Fig. 16 is a horizontal section of the same in line $vv$, Fig. 15. Fig. 17 is a side elevation of the inner bearings of the lower feed-rollers.

Like letters of reference refer to like parts in the several figures.

A represents the frame of the machine, which consists of four legs, $a$, connected by cross-pieces $a'$, and a bed-plate, A', which is supported upon the legs $a$ in sockets $a^2$, formed on the under side of the bed-plate A'. The bed-plate A' is constructed with a central circular opening, and a circular rim or collar, $a^3$, which surrounds the opening on the under side of the bed-plate.

B represents a horizontal disk, which is cast with a central hollow sleeve or hub, B'. The hub B' is provided on its outer side with an offset or annular shoulder, $b$, which rests upon the rim $a^3$ of the bed-plate, and by means of which the disk B and hub B' are supported, so that the disk can rotate above the bed-plate without touching the same.

$b'$ represents three grooved or dovetailed ways formed on the upper face of the disk B and arranged radially from the hub B', and $b^2$ are openings formed in the hub B' in line with the ways $b'$.

$b^3$ represents the stocks or bars which carry the cutters, and which are arranged to slide in the ways $b'$, with their inner ends protruding through the openings $b^2$ into the hub B'.

C represents the adjustable knives or cutters arranged in the revolving sleeve or hub B', and which are secured to the inner ends of the stocks $b^3$ by slotted arms $c'$ and screws $c^2$.

$C^3$ represents curved guide-plates secured to or formed at the inner ends of the stocks $b^3$, below the cutters C, and extending downward in the sleeve B' in line, or nearly so, with the cutters, and forming guides for retaining the ears of corn in a perpendicular position. Suitable scraper-plates, $c^4$, may be secured to the curved guide-plates $C^3$, if desired, to remove any particles of the kernels of corn from the cob that have not been removed by the cutters C. These scraper-plates are arranged on the rear sides of the cutters, and project farther inward than the cutters, as represented in Figs. 10 and 11.

D represents a movable ring secured to the disk B by metal straps $d$. The latter are provided with slots or grooves, to allow a free movement of the ring D upon the disk B concentric therewith. $d'$ are inclined or eccentric slots formed in the ring D, and arranged above the ways $b'$, and $d^2$ are guide-rollers secured to the stocks $b^3$ by bolts $d^3$, and projecting into the slots $d'$.

$d^4$ represents a spiral or other suitable spring, which is secured at one end to the ring D and at its opposite end to the disk B by means of a screw-bolt, $d^5$. The latter is provided with a thumb-nut, $d^6$, by means of which the bolt $d^5$ can be adjusted and the tension of the spring $d^4$ regulated. By means of the slotted ring and spring $d^4$, the cutters are held nearest the center of the machine, but permitted to recede and adapt themselves to the various sizes of the ears of corn operated upon.

E represents a toothed or geared rim secured to the lower end of the hub or sleeve B', and meshing with a bevel-wheel, F, mounted on the driving shaft $f$ of the machine. The shaft $f$ is journaled in bearings $f'$, secured to the cross-pieces $a'$ of the frame, and is provided at one end with a balance-wheel, $f^2$, and crank $f^3$, or other suitable mechanism, by means of which motion is imparted to the machine.

J J represent the feed-wheels, which are arranged above the upper end of the revolving sleeve or hub B', and which are constructed with concave faces adapted to receive an ear of corn and propel it downward between the cutters C. The feed-wheels are preferably provided on their faces with two or more rows of spurs or teeth, $j$, which penetrate the ears of corn as they are fed between the feed-wheels, and firmly hold the same from turning when brought in contact with the revolving cutters.

$h\ h'$ represent the horizontal shafts of the feed-wheels, supported at their inner ends in adjustable bearings $k$, and near their outer ends in pivoted standard-bearings H H'.

$g$ is a grooved pulley secured to the driving-shaft $f$, and $g'$ is a similar pulley secured to the outer end of the shaft $h$. Motion is imparted to the pulley $g'$ from the pulley $g$ by means of an endless belt, $g^2$. $i$ is a pinion secured to the shaft $h$, and $i'$ is a similar pinion mounted on the shaft $h'$ and meshing with the pinion $i$. The standards H H' are pivoted at their lower ends in sockets or lugs formed with or secured to the bed-plate A', so as to permit a horizontal movement of the shafts journaled in said bearings. The adjustable bearings $k$, supporting the inner ends of the shafts $h\ h'$, are secured to a frame, K, which is suspended below the feed-wheels J by means of an overhanging arm, K', secured to the bed-plate A'.

$k'$ is a rearwardly-projecting rod formed on each bearing $k$, and seated in a cylindrical socket, $k^2$, secured to the frame K by a screw-bolt, $k^3$. The rod $k'$ is provided with a contracted portion, $k^4$, which is surrounded by a spiral spring, $k^5$, seated in the socket $k^2$. The outer end of the rod $k'$ extends through an opening in the end of the socket, and is provided with a screw-thread and thumb-nut, $k^6$. By tightening the thumb-nut $k^6$, the spring is compressed between the shoulder of the rod $k'$ and the end of the socket $k^2$, and the bearing $k$ thereby adjusted. This construction of the bearings allows the bearings and feed-rollers to separate when an ear of corn of unusual size enters between the rollers, and the springs tend to hold the feed-rollers in close contact with the ear of corn.

$l\ l$ represent self-adjusting feed-gages, which constitute a feed hopper or funnel, L, into which the ears of corn to be cut are placed, and which guide the ears between the feed-wheels. The gages $l$ form a conduit having a discharge-opening of the proper size to allow the passage of but one ear of corn at a time. The gages $l\ l$ are supported above the feed-wheels J, and are secured at one side to the bearings $k$ by arms $l'$, and supported on the opposite side of the feed-wheels by arms $l^2$ on the shafts $h\ h'$ of the feed-wheels. By supporting the gages $l$ of the feed-hopper on the bearings and shafts of the feed-wheels, the gages $l$ are caused to take part in the lateral movement of the feed-wheels.

M M represent a pair of feed-wheels arranged below the sleeve B' and in line with the feed-wheels J. The feed-wheels M are secured to horizontal shafts $m\ m'$, which are supported at their outer ends in hangers N N', attached by vertical pivots to lugs $n\ n'$, formed on the bed-plate A', so as to permit the shafts $m\ m'$ to turn horizontally on the vertical pivots of the hangers. The inner ends of the shafts $m\ m'$ are supported in movable bearings $o$, which are constructed like the corresponding bearings, $k$, of the upper feed-rollers, J, to permit the feed-rollers to move toward or from each other and firmly hold the ears of corn. The supporting-sleeves of the bearings $o$ are secured to a bridge-piece, $o'$, which extends across the machine below the lower end of the revolving sleeve B', and which is secured with its ends to the bed-plate A', as clearly shown in Fig. 17.

$p$ represents a grooved pulley secured to the outer end of the shaft $m$, and $p$ a similar pulley secured to the driving-shaft $f$, and $p^2$ an endless belt running over the pulleys $p\ p'$, whereby motion is imparted from the driving-shaft $f$ to the shaft $m$. The shaft $m$ is provided with a gear-wheel, $q$, which meshes with a similar gear-wheel, $q'$, whereby motion is imparted to the shaft $m'$ from the shaft $m$.

R represents the discharge-spout, which is arranged below the sleeve or collar B' and the feed-wheels M M', and into which the cut corn and cobs are delivered.

$s\ s$ represent curved scraper-plates arranged in the upper portion of the discharge-spout below the lower pair of feed-wheels. The ears of corn, after leaving the cutters and feed-wheels, pass between the scraper-plates $s\ s$, which remove any remaining particles of the kernels that may still adhere to the cob before the latter is finally discharged into the spout R. The scrapers $s$ are pivoted at one end to lugs $s'$, secured to the side of the discharge-spout, and their opposite ends are held together by a rubber ring, $s^2$, or other suitable elastic device. The scrapers $s$ are arranged in pairs, one above the other, one pair being at right angles to the other, so as to scrape the ears of corn on all sides. The discharge-spout R is provided with longitudinal wires or rods $r$, extending across the discharge-spout in an inclined position, and forming a grate or separator, by means of which the cobs are separated from the cut kernels. The latter pass through the spaces between the wires $r$, and are discharged through the spout $r'$ at the lower end of the spout R. The cobs remain above the wires and pass out through an opening, $r^2$, on the rear side of the discharge-spout.

As shown in Figs. 15 and 16, the discharge-spout R may be provided with an endless open belt composed of a series of wires or rods, $r^3$, running over suitable pulleys, whereby the cobs are carried off laterally to a suitable receptacle, while the cut kernels pass downward through the spaces between the endless wires. The ears of corn are fed one by one between the gages $l$, which guide the ears between the upper feed-rollers, J. The latter seize the ear firmly and propel the same between the cutters C, which rotate with the tubular sleeve B'. The cutters C detach the kernels from the cobs, and the cobs are guided by the depending guides attached to the cutters between the lower feed-rollers, M M. The latter are preferably arranged at such a distance from the upper feed-rollers that an ear of average size will be held at the same time by both pairs of feed-rollers above and below the cutters. The lower pair of feed-rollers push the cobs between the stationary scrapers $s$, which remove the adhering portion of the valuable material from the cobs, and the latter are then separated from the cut corn and both products discharged separately.

I claim as my invention—

1. The combination, with the revolving sleeve B', provided with adjustable cutters C, of feed-wheels J, mounted on shafts $h\ h'$, mechanism whereby motion is transmitted to both of said shafts, and adjustable bearings, in which both shafts are mounted, and which permit both feed-wheels to adjust themselves toward or from the axis of the sleeve B', substantially as set forth.

2. The combination, with the revolving sleeve B', provided with adjustable cutters C, of feed-wheels J, mounted in adjustable bearings, mechanism whereby both feed-wheels are rotated, and gages $l$, secured to the adjustable bearings of the feed-wheels, substantially as set forth.

3. The combination, with the revolving sleeve B', provided with adjustable cutters C, of the gages $l$, feed-wheels J, arranged between the funnel L and the cutters C, feed-wheels M, arranged at the discharge end of the revolving sleeve B', and scrapers $s$, arranged below the feed-wheels M, substantially as set forth.

4. The combination, with the revolving disk B, provided with sleeve B', and radial ways $b'$, of the sliding cutter-stocks $b^3$, ring D, provided with inclined slots $d'$, and the spring $d^4$, substantially as set forth.

5. The combination, with the feed-wheels J and the shafts $h\ h'$, of the pivoted bearings H H', supporting the outer ends of the shafts, and yielding bearings $k$, supporting the inner ends of the shafts, whereby the inner ends of the shafts are enabled to move toward or from each other without changing the distance between the outer bearings, H H', substantially as set forth.

6. The combination, with the feed-wheels J and their shafts $h\ h'$, of the pivoted bearings H H', supporting the outer ends of said shafts, and the sliding bearings $k$, supporting the inner ends of said shafts, and provided with bolts $k'$, springs $k^5$, and supporting-sleeves $k^2$, substantially as set forth.

7. The combination, with the feed-wheels J and the bearings $k$, of the gages $l$, secured to said bearings, substantially as set forth.

HENRY F. ZEHNDER.

Witnesses:
   JNO. J. BONNER,
   CHAS. F. GEYER.